Patented Feb. 7, 1950

2,496,335

UNITED STATES PATENT OFFICE 2,496,335

DIALKYL SILANE DERIVATIVE OF RICINOLEIC ACID ESTER

Robert Edward Christ, Elizabeth, N. J., assignor to U. S. Industrial Chemicals, Inc., New York, N. Y., a corporation of Delaware No Drawing. Application November 27, 1948, Serial No. 62,430

3 Claims. (Cl. 260—448.8)

This invention relates to new compositions of matter which are useful plasticizers for nitrocellulose.

A great many plasticizers for nitrocellulose are known. There is a need in the art, however, for additional plasticizers which, when combined with nitrocellulose, will yield films of low elastic modulus and high folding flexibility. In addition, there is a need for plasticizers which with nitrocellulose produce films of increased useful working temperature range and increased flexibility at low temperatures.

It is the object of the present invention to provide improved plasticizers for nitrocellulose meeting the aforementioned requirements.

The aforementioned and other objects are accomplished in accordance with the present invention bp providing a composition which consists essentially of a compound or compounds having the generic formula

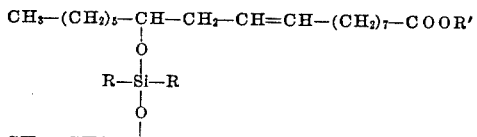

in which R and R' are alkyl radicals having from one to six carbon atoms. Preferably both R and R' are normal alkyl radicals.

The following example illustrates in detail the preparation of a specific composition falling within the scope of the present invention, and is to be considered not limitative thereof.

Example

A mixture which consisted essentially of butyl ricinoleate was prepared by the alcoholysis of castor oil with butyl alcohol. 354.6 gms. of this material and 88 gms. of diethyl diethoxy silane were charged into a three-necked flask fitted with a thermometer, stirrer, reflux take-off head, a vapor thermometer and a reflux condenser. The temperature of the reaction mixture was then raised to about 118° C., at which point the vapor temperature was about 83° C. due to the refluxing of ethyl alcohol resulting from the reaction. The refluxing was maintained for about two hours, after which the ethyl alcohol was gradually removed by means of the take-off head. When the temperature in the flask reached about 200° C.. the heating was stopped and the batch was permitted to cool. The remainder of the ethyl alcohol was then removed at an absolute pressure of about 25 mm. of mercury.

This procedure yielded 374 gms. of a composition which consisted essentially of the compound

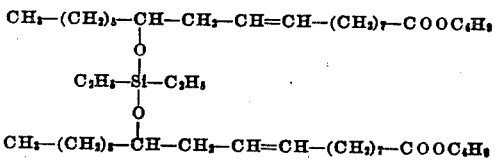

The composition prepared as described had a Gardner-Holdt viscosity of A1, a kinematic viscosity at 210° F. of 11.01 centistokes, a kinematic viscosity at 100° F. of 33.4 centistokes, a viscosity index of 177 and a refractive index of 1.461.

Since castor oil is widely used in the art for plasticizing nitrocellulose films, a comparison was made between castor oil and the above composition when employed for that purpose. In making this comparison, nitrocellulose solutions were prepared according to the formulations listed in the table below.

| | | |
|---|---|---|
| Nitrocellulose, gm | 104.3 | 104.3 |
| AA Castor Oil, gm | 156.5 | |
| Composition of Example, gm | — | 156.5 |
| Alcohol 2B, ml | 101.7 | 101.7 |
| Toluene, ml | 400.1 | 400.1 |
| Butyl acetate, ml | 237.4 | 237.4 |

The nitrocellulose used was a commercial grade, having a viscosity of 33 seconds and a nitrogen content of 11.8–12.2%, and the alcohol 2B contained 100 volumes of 200° proof ethyl alcohol per 0.5 volume of benzene.

A master batch of solution was first prepared by wetting the nitrocellulose with the non-solvents (Alcohol 2B and toluene), and then adding the butyl acetate. This mixture was then tumbled until the solution was completely homogeneous, after which the solution was filtered through a mat of glass wool, using pressure. The nitrocellulose solution and the plasticizer were thereafter weighed out in the correct proportions, and the mixture was again tumbled until it was completely homogeneous. Films were prepared by spreading the solution on glass by means of a doctor blade. The films thus laid down were conditioned at room temperature for 24 hours, followed by a further conditioning of 24 hours at 50° C. under forced air drying. The final thickness of the films was approximately 0.004".

The properties of the films compared as is shown in the following table:

| | | |
|---|---|---|
| Nitrocellulose (33 sec.) | 104.3 | 104.3 |
| AA castor oil | 156.5 | |
| Composition of Example | — | 156.5 |
| Elastic modulus, 50% stretch | 1,900 | 1,590 |
| Elongation at break, per cent | 91 | 93 |
| Tensile strength, lbs./in.² | 2,500 | 2,510 |
| Spew point, °F | 165 | 190 |
| Cold crack, °F | +2 | −56 |
| MIT Flex Folds, at 0° C | 800 | 2,250 |
| Hardness, Sward rocker | 6 | 8 |

In the table above, the spew point is the lowest temperature at which exudation of the plasticizer takes place on heating the film for one hour in an oven with air circulation. The exudation was tested for by quickly rubbing the film on a clean slate, which was also kept in the oven. An oily streak on the slate indicated spewing.

The cold crack point is essentially the temperature at which the film becomes brittle enough to break under a sudden shock or strain. The apparatus employed in determining the cold crack point consisted of a standard test tube holder with a sliding lock to hold the jaws of the holder open. The film was tested by placing it in the open jaws of the holder, immersing the entire lower half of the apparatus in a Dewar flask to bring the film to the desired temperature, and then releasing the jaws by pulling up on the sliding lock after temperature equilibrium had been reached in the film. This procedure imparted simultaneously a sharp crease and a shattering blow to the film. This procedure was repeated at 5° C. at intervals until the film cracked under the impact of the jaws.

The MIT Flex Folds test involves holding a strip of film under a definite tension and bending it rapidly around a curved surface until failure occurs. This is a useful test for all types of papers, films, or packaging materials which are creased, bent sharply, or handled to a considerable extent during their useful life.

From the preceding table it is apparent that the film plasticized with the composition prepared as above described had a much lower elastic modulus than that plasticized with castor oil. As a result, the former film was more useful in the coating of fabrics, since a film having a low elastic modulus produces a soft feeling and good drape in coated fabrics, in contrast to a hard feeling and boardiness produced by films of high elastic modulus.

It is also apparent from the foregoing table that the composition prepared as described has a wider useful range (the spread between the cold crack point and the spew point), than castor oil, the ranges being, respectively, 264° F. and 163° F.

A variety of modifications may be made in the specific procedure of the example to provide additional compositions falling within the scope of the present invention. Thus, such compounds may also be prepared by reacting methyl ricinoleate and dimethyl diethoxy silane with removal of ethyl alcohol, ethyl ricinoleate and dimethyl diethoxy silane with removal of ethyl alcohol, butyl ricinoleate and di-isopropyl dimethoxy silane with removal of methyl alcohol, isobutyl ricinoleate and di-n-butyl diethoxy silane with removal of ethyl alcohol, n-amyl ricinoleate and di-n-propyl diethoxy silane with removal of ethyl alcohol, n-hexyl ricinoleate and di-n-propyl diethoxy silane with removal of ethyl alcohol, etc. In addition, compositions falling within the scope of this invention may also be prepared by reacting a mixture of any of the aforementioned ricinoleates with a mixture of any of the aforementioned silanes. Furthermore, the R's of the generic formula need not be the same alkyl radical, ethyl n-propyl diethoxy silane, ethyl isobutyl diethoxy silane, etc. also being useful in preparing the compositions described herein. The reaction mixture should contain substantially two moles of ricinoleate ester per mole of silane.

The compositions of the present invention supply a need in the art for additional plasticizers for nitrocellulose films, and are useful for that purpose in that the films thus prepared are characterized by a low elastic modulus, a wide working range, by high folding flexibility, and by other advantageous properties.

I claim:

1. A composition which is a useful plasticizer for nitrocellulose, the said composition consisting essentially of a compound having the generic formula

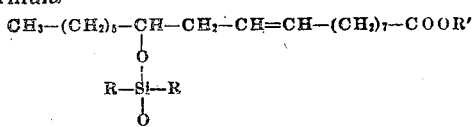

in which R and R' are alkyl radicals having from one to six carbon atoms.

2. The composition of claim 1 in which R and R' are normal alkyl radicals.

3. The composition of claim 2 in which R is the ethyl radical and R' the n-butyl radical.

ROBERT EDWARD CHRIST.

REFERENCES CITED

The following references are of record in the file of this patent:

UNITED STATES PATENTS

| Number | Name | Date |
|---|---|---|
| 1,918,338 | Kaufman | July 18, 1933 |
| 2,270,352 | Sowa | Jan. 20, 1942 |

FOREIGN PATENTS

| Number | Country | Date |
|---|---|---|
| 625,077 | Germany | May 24, 1938 |

OTHER REFERENCES

Kreshkov, Jour. Gen. Chem. (U. S. S. R.), Vol 17 (1947), pages 81–86.

Certificate of Correction

Patent No. 2,496,335 February 7, 1950

ROBERT EDWARD CHRIST

It is hereby certified that errors appear in the printed specification of the above numbered patent requiring correction as follows:

Column 1, line 18, for "bp" read *by*; column 3, line 64, for "264° F." read *246° F.*; and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*